T. GORDON.
TIRE.
APPLICATION FILED NOV. 29, 1919.
1,348,714.
Patented Aug. 3, 1920.
2 SHEETS—SHEET 1.
Fig. 1.
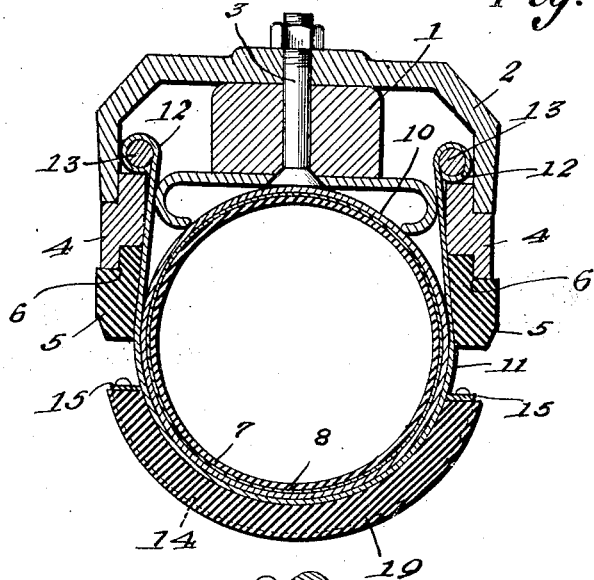
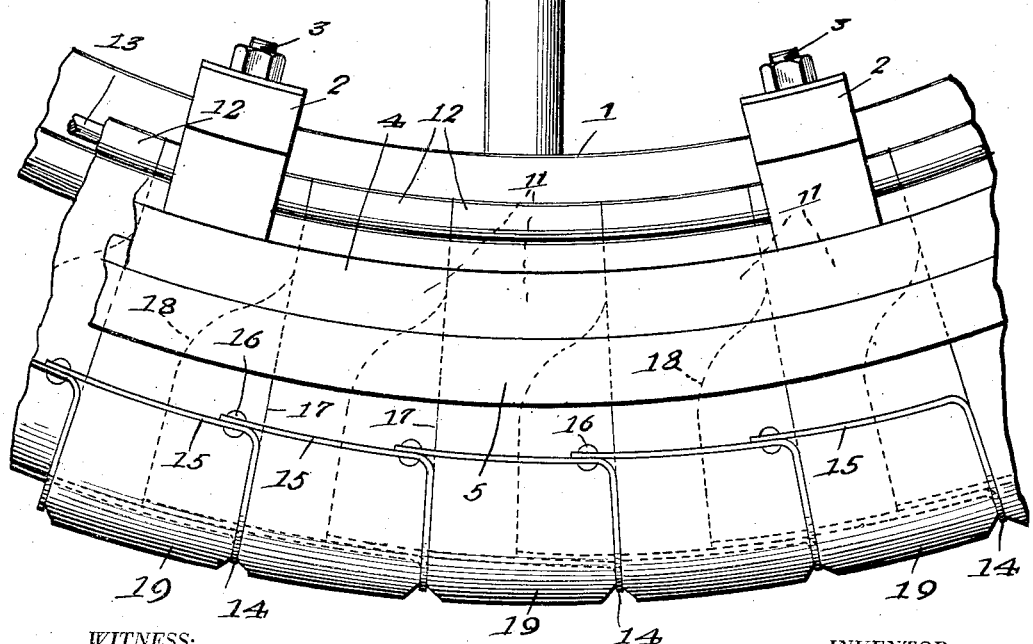
Fig. 2.
WITNESS:
R. A. Thomas
INVENTOR.
BY Thomas Gordon
Victor J. Evans
ATTORNEY.

T. GORDON.
TIRE.
APPLICATION FILED NOV. 29, 1919.

1,348,714.

Patented Aug. 3, 1920.
2 SHEETS—SHEET 2.

WITNESS:
R. A. Thomas

INVENTOR.
BY Thomas Gordon
Victor J. Evans
ATTORNEY.

UNITED STATES PATENT OFFICE.

THOMAS GORDON, OF VANCOUVER, BRITISH COLUMBIA, CANADA.

TIRE.

1,348,714.  Specification of Letters Patent.  Patented Aug. 3, 1920.

Application filed November 29, 1919. Serial No. 341,447.

*To all whom it may concern:*

Be it known that I, THOMAS GORDON, a subject of the King of England, residing at Union Bay, Vancouver, in the Province of British Columbia and Dominion of Canada, have invented new and useful Improvements in Tires, of which the following is a specification.

The object of my present sole invention is the provision of an armored pneumatic tire embodying such construction and relative arrangement of parts that it is sufficiently resilient for use on the wheels of automobiles and trucks, and yet is practically puncture-proof.

To the attainment of the foregoing, the invention consists in the peculiar tire hereinafter described and definitely claimed.

In the accompanying drawings, hereby made a part hereof:

Figure 1 is a transverse section illustrating an ordinary wheel rim equipped with the tire constituting the best practical embodiment of my invention of which I am aware.

Fig. 2 is a side elevation of a portion of the tire.

Figure 4:
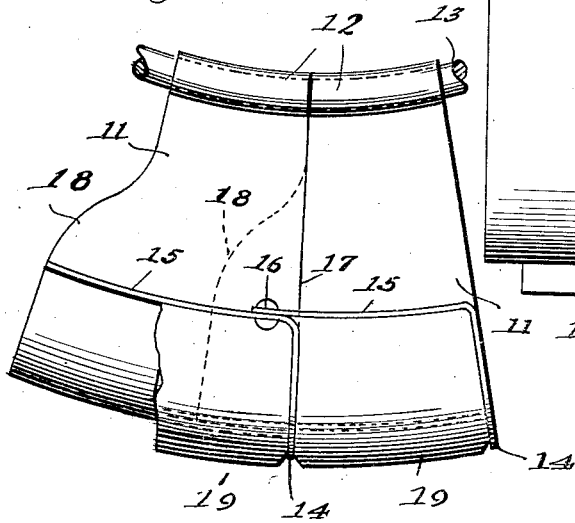
Figs. 4 and 5 are detail views taken at right angles to each other and showing the relative arrangement of the sections of the outer metallic casing of the tire.
Figure 5:
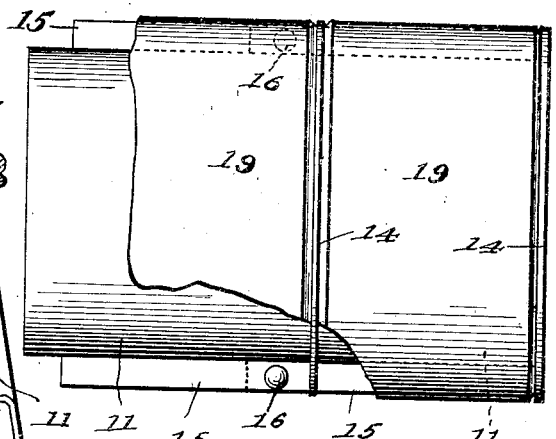

Fig. 4 being in a side view of the outer metallic casing of the tire, and Fig. 5, a plan view.

Similar numerals designate corresponding parts in all of the views of the drawings.

I have elected to show my novel tire as applied to an ordinary wheel rim 1, Fig. 1, with a view toward emphasizing the fact that the sectional metallic casing hereinafter referred to may be used to advantage over an ordinary rubber tire, and the fact that the spiral spring steel protector and its covering jacket may be arranged over an ordinary inner tube without the employment of the said sectional metallic casing. It is therefore to be understood that my novel tire may be applied to and used in conjunction with a wheel rim of any suitable type.

Among other elements my improvement comprises metallic clips 2, designed to straddle a rim 1 from the inner side at intervals in the length of the rim, and to be connected to the rim through the medium of bolts 3.

The improvement also comprises stepped annular members 4 lapped with and opposed to the edges of the clips 2; the said annular members 4 being preferably of steel, and annular buffer bands 5 which are stepped at 6, and are arranged in lapped relation with and opposed to the outer edges of the annular members 4. The said buffers 5 are formed of a kind of rubber suitable to the purpose that the buffers are adapted to serve. Manifestly the lapped relation of the members 4 to the clips 2, and the lapped relation of the buffers 5 to the members 4 may be depended upon to prevent lateral disconnection of the said members 4 and buffers 5.

At 7 is an ordinary inflatable inner tube, and at 8 is a resilient and spiral protector that is formed of thin spring steel and incloses the tube 7, and is overlapped, as indicated by 9, between its convolutions, whereby the said protector is adapted to prevent an extraneous pointed object from reaching and engaging the tube 7. The said protector 8 is incased in a heavy rubber-coated jacket 10, of canvas or equivalent textile material. The said jacket is designed and adapted to prevent chafing and the consequent generation of heat incidental to the use of the tire.

Straddling the jacket 10 are the sections 11 of the metallic outer casing. These sections 11 are preferably of steel, and each is provided at its ends with eyes 12 which are opposed to the inner edges of the annular members 4, and receive endless metallic rings 13 by which the sections 11 are retained in position. As best shown in Figs. 2, 4 and 5, the casing sections 11 are provided with outwardly directed end flanges 14 and side flanges 15; the flanges 15 of adjoining sections being lapped and riveted together, as indicated by 16.

The side portions of the casing sections 11 have their edges converged toward the longitudinal-vertical center of the wheel, *i. e.*, inwardly and the inner portions of the side edges of adjoining sections 11 abut against each other, as indicated by 17 in Fig. 4. The peripheral portions of the casing sections 11 however, are lapped, as indicated by 18 in Fig. 4, with a view to increasing the protective capacity of the casing without preventing the said casing from lending itself to the cushioning quality of the tire.

The flanges 14 and 15 of the casing sections 11 form pockets, and in the said pockets are disposed and held heavy rubber thread sections 19.

It will be apparent from the foregoing that my novel tire is possessed of considerable cushioning capacity, and at the same time is practically puncture-proof and extremely durable. This latter will be better appreciated when it is stated that in the event of the inner tube 7 becoming deflated, the flanges 15 of the casing sections 11 will bring up against the cushioning buffers 5, with the result that complete collapse of the casing sections 11 will be prevented, and injury to the protector 8 and the inflatable tube 7 will be precluded.

Figure 3:
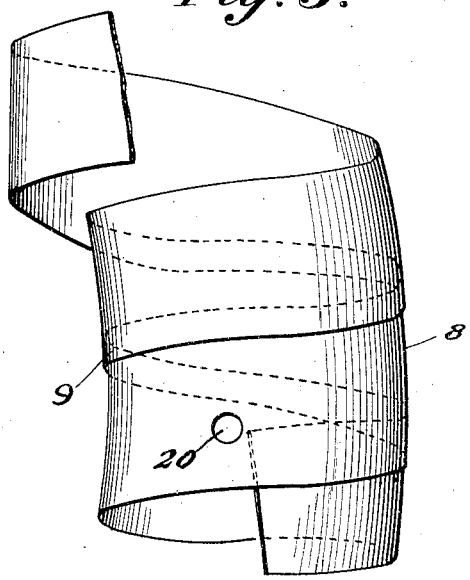
Fig. 3 is a perspective of the thin spiral spring protector comprised in my improvement.

As indicated by 20 in Fig. 3, the protector 8 is provided with an aperture for the reception of the usual inflation nipple connected to the inflatable tube 7.

Manifestly when deemed expedient an ordinary protective liner may be used in conjunction with the inner tube 7, without affecting my invention.

Having described my invention, what I claim and desire to secure by Letters-Patent, is:

1. A tire comprising clips adapted to straddle a wheel rim from within and to be connected to said rim, annular stepped metallic members surrounding and opposed to the ends of the clips and arranged in lapped relation thereto, annular stepped buffers surrounding and opposed to the outer edges of the said members and lapped therewith, lapped metallic sections having eyes at their ends opposed to the inner edges of the annular members, and endless metallic rings occupying said eyes and arranged within the clips.

2. A tire comprising clips adapted to straddle a wheel rim from within and to be connected to said rim, annular stepped metallic members surrounding and opposed to the ends of the clips and arranged in lapped relation thereto, annular stepped buffers surrounding and opposed to the outer edges of the said members and lapped therewith, lapped metallic casing sections having eyes at their ends opposed to the inner edges of the annular members, and also having exterior end and side flanges, tread sections arranged in the pockets formed by said flanges, and endless metallic rings occupying the eyes of the casing sections and arranged within the clips.

3. A tire comprising lapped casing sections, annular buffers arranged at opposite sides of the casing sections, and tread sections and holders therefor carried by the casing sections; said holders being opposed to and adapted to bring up against said annular buffers.

In testimony whereof I affix my signature.

THOMAS GORDON.